(12) United States Patent
Chrisikos

(10) Patent No.: US 10,708,934 B2
(45) Date of Patent: *Jul. 7, 2020

(54) MULTI-CARRIER THROUGHPUT ENHANCEMENT BY OPPORTUNISTIC PACKET SCHEDULING WITH SPS CONCURRENCY

(71) Applicant: QUALCOMM Incorporated, San Diego, CA (US)

(72) Inventor: George Chrisikos, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/045,587

(22) Filed: Jul. 25, 2018

(65) Prior Publication Data

US 2018/0332600 A1    Nov. 15, 2018

Related U.S. Application Data

(63) Continuation of application No. 14/863,089, filed on Sep. 23, 2015, now Pat. No. 10,064,208.

(Continued)

(51) Int. Cl.
*H04W 72/12*        (2009.01)
*G01S 19/42*        (2010.01)
(Continued)

(52) U.S. Cl.
CPC ......... *H04W 72/1231* (2013.01); *G01S 19/42* (2013.01); *H04W 72/1215* (2013.01);
(Continued)

(58) Field of Classification Search
CPC ............. H04W 36/30; H04W 72/1215; H04W 28/048; H04W 36/20; H04W 88/06; H04W 36/14; H04W 36/24
See application file for complete search history.

(56) References Cited

U.S. PATENT DOCUMENTS 10,064,208 B2 *  8/2018  Chrisikos .......... H04W 72/1231
2008/0279137 A1   11/2008  Pernu et al.
(Continued)

FOREIGN PATENT DOCUMENTS

EP      2244509 A2    10/2010
WO  2011157235 A1    12/2011
(Continued)

OTHER PUBLICATIONS

International Search Report and Written Opinion—PCT/US2016/042897—ISA/EPO—dated Sep. 21, 2016.

*Primary Examiner* — Benjamin H Elliott, IV
(74) *Attorney, Agent, or Firm* — Kilpatrick Townsend & Stockton, LLP

(57) ABSTRACT

Methods, systems, computer-readable media, and apparatuses for managing coexistence of a satellite positioning system (SPS) receiver with one or more transceivers are presented. In some embodiments, a device determines whether a first transceiver of the one or more transceivers in accordance with a first Radio Access Technology (RAT) is able to transmit a packet via a first frequency band within a time period based at least on a first coexistence rule. The first coexistence rule corresponds to an impact on the SPS receiver by operation of at least the first RAT on the at least the first transceiver. The device transmits the packet via a second frequency band in accordance with a second RAT based on the determination that the first transceiver in accordance with the first RAT is not able to transmit the packet via a first frequency band within the time period.

24 Claims, 12 Drawing Sheets

Related U.S. Application Data

(60) Provisional application No. 62/209,234, filed on Aug. 24, 2015.

(51) Int. Cl.
  *H04W 84/04* (2009.01)
  *H04W 84/12* (2009.01)
  *H04W 88/06* (2009.01)

(52) U.S. Cl.
  CPC .......... *H04W 84/042* (2013.01); *H04W 84/12* (2013.01); *H04W 88/06* (2013.01)

(56) References Cited

U.S. PATENT DOCUMENTS

| | | |
|---|---|---|
| 2010/0304685 A1 | 12/2010 | Wietfeldt et al. |
| 2012/0069766 A1 | 3/2012 | Fu et al. |
| 2012/0129457 A1 | 5/2012 | Linsky |
| 2012/0163307 A1 | 6/2012 | Wang et al. |
| 2012/0182896 A1 | 7/2012 | Jang et al. |
| 2012/0207040 A1 | 8/2012 | Comsa et al. |
| 2012/0213150 A1 | 8/2012 | Oguz et al. |
| 2013/0070653 A1 | 3/2013 | Banister et al. |
| 2013/0114583 A1 | 5/2013 | Park et al. |
| 2013/0235814 A1 | 9/2013 | Wietfeldt et al. |
| 2013/0301420 A1 | 11/2013 | Zhang et al. |
| 2013/0303215 A1 | 11/2013 | Piipponen et al. |
| 2014/0050146 A1 | 2/2014 | Chrisikos et al. |
| 2014/0226502 A1 | 8/2014 | Behnamfar et al. |
| 2014/0269468 A1 | 9/2014 | Jia et al. |
| 2014/0328331 A1 | 11/2014 | Truong et al. |
| 2015/0305039 A1 | 10/2015 | Sebire |
| 2017/0064727 A1 | 3/2017 | Chrisikos |
| 2018/0332600 A1* | 11/2018 | Chrisikos .......... H04W 72/1231 |

FOREIGN PATENT DOCUMENTS

| | | |
|---|---|---|
| WO | 2014070768 A1 | 5/2014 |
| WO | 2016126393 A1 | 8/2016 |

* cited by examiner

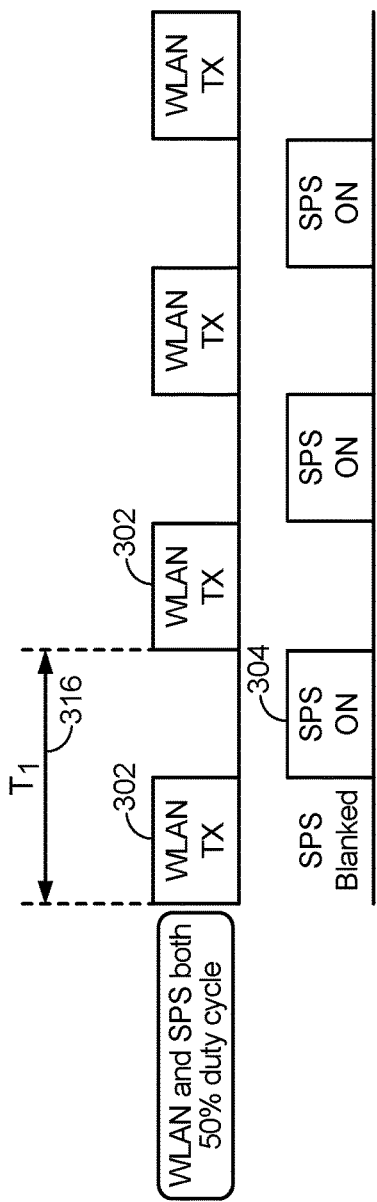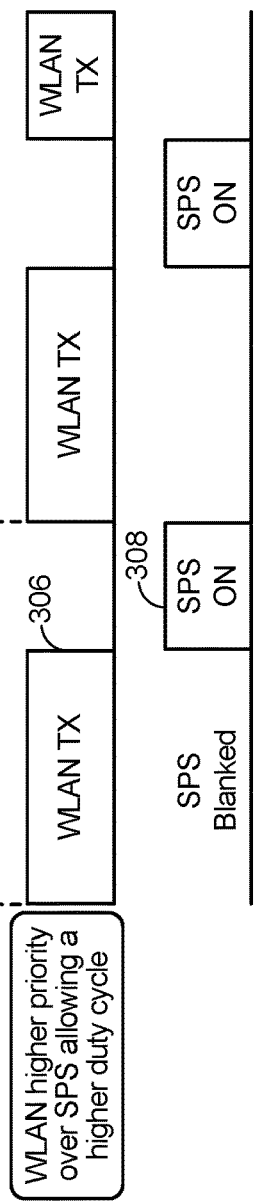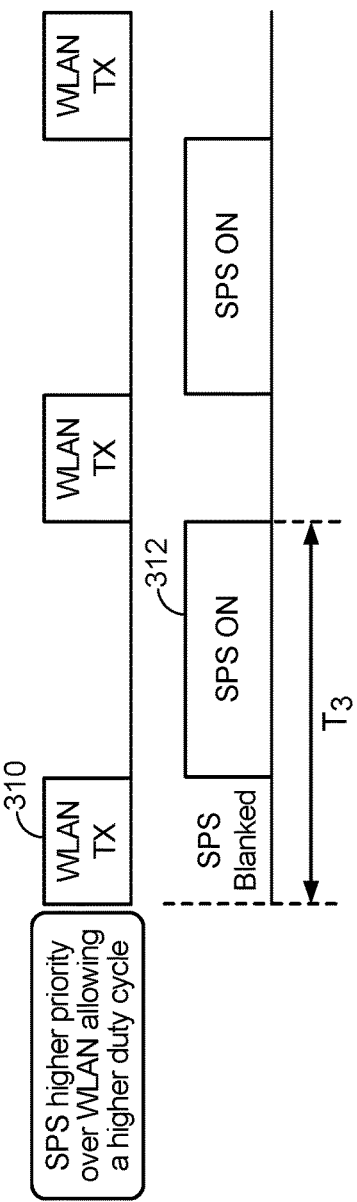

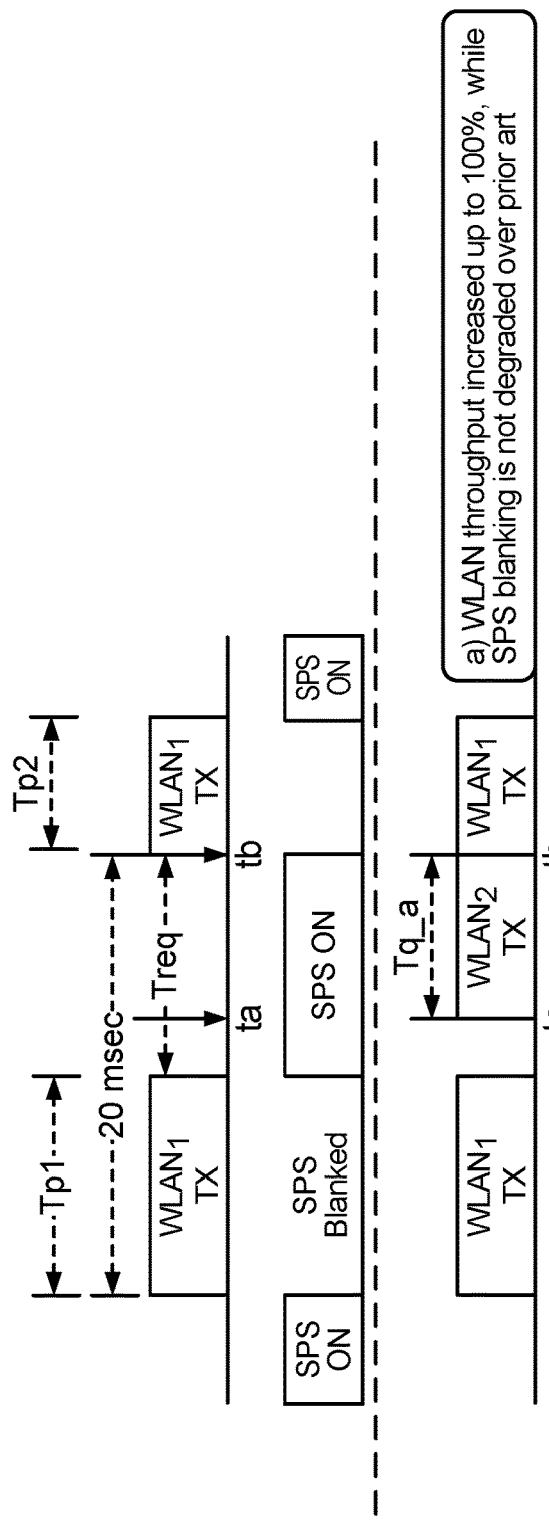
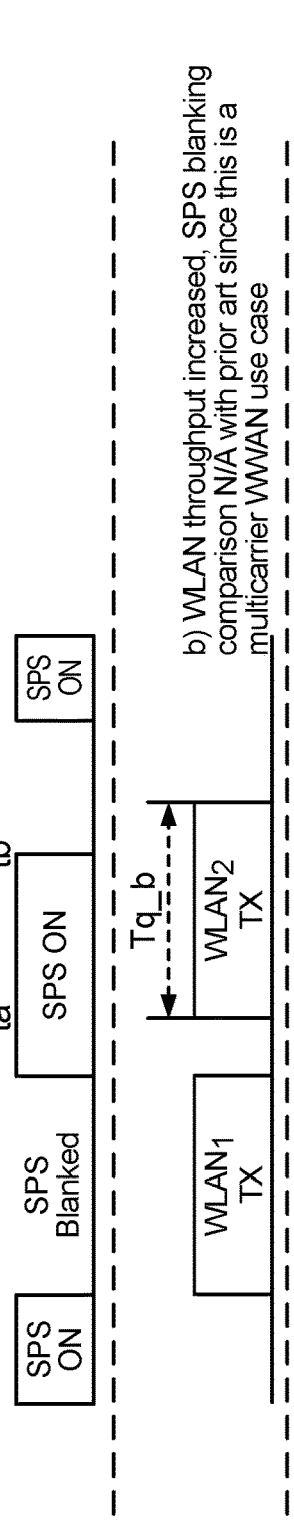
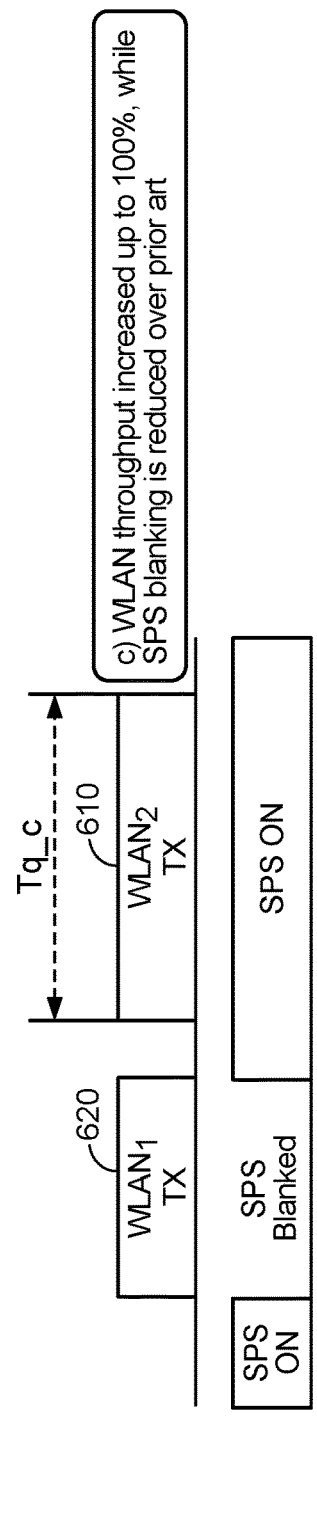
FIG. 6D
FIG. 6A
FIG. 6B
FIG. 6C

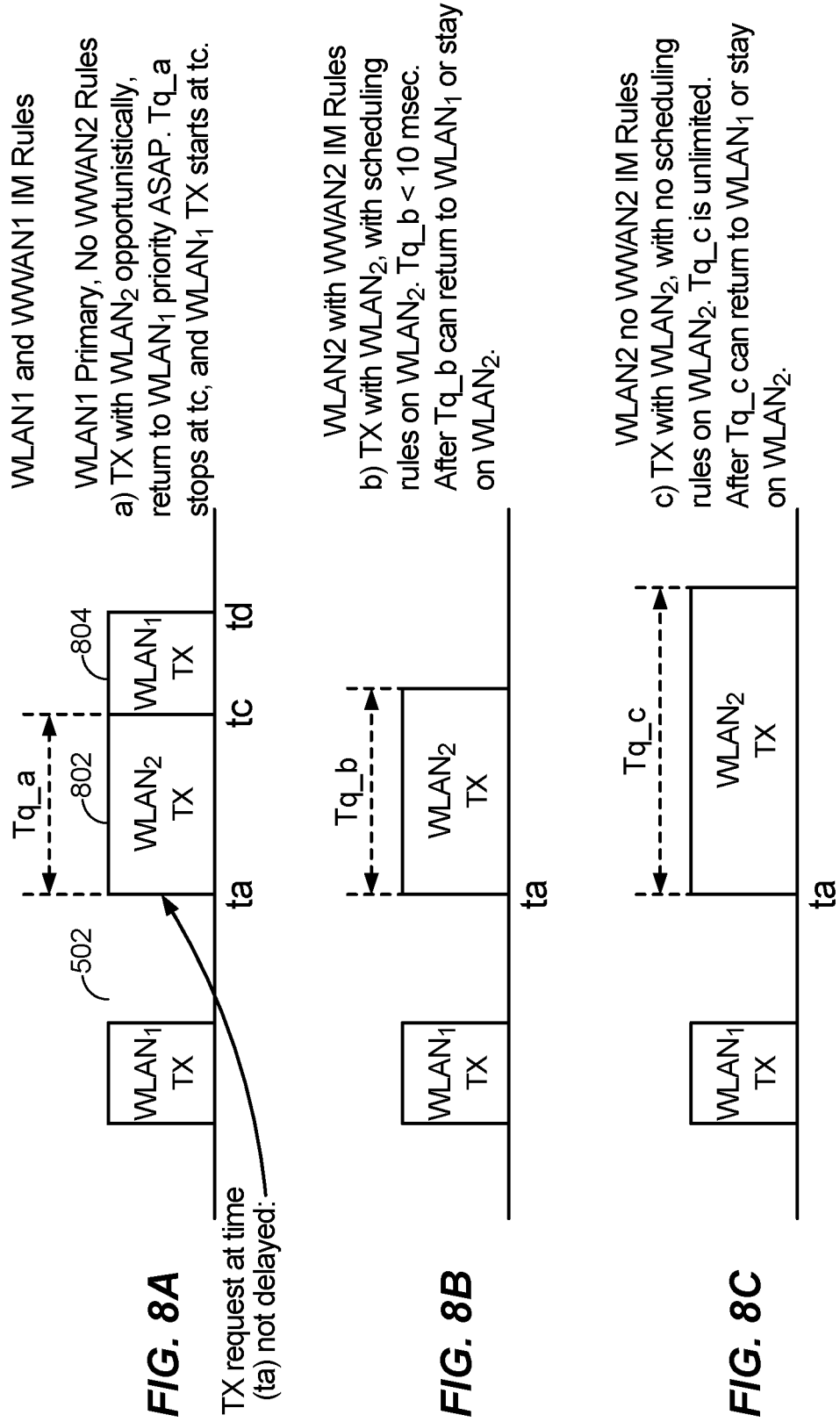

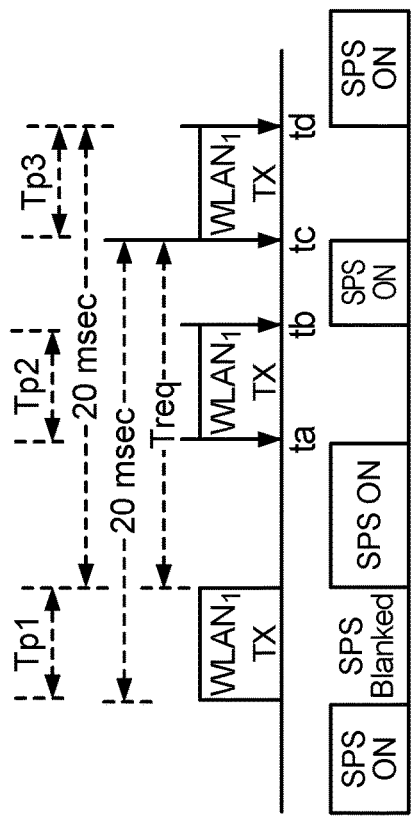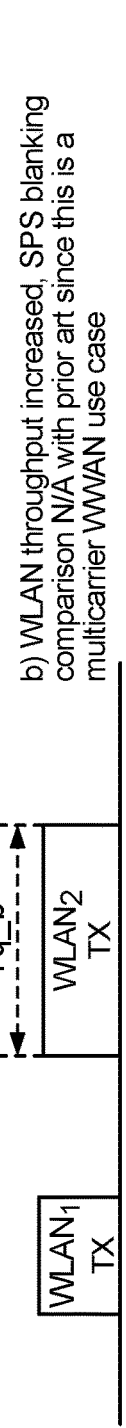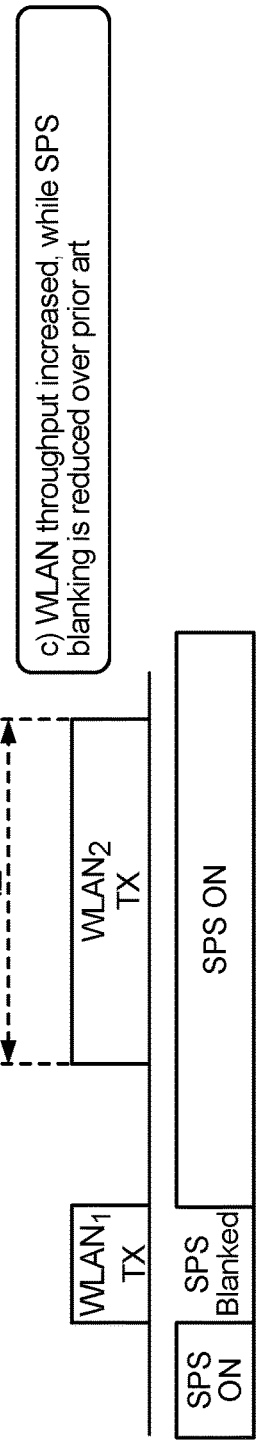
FIG. 9D
FIG. 9A
FIG. 9B
FIG. 9C

1000

1002

DETERMINE WHETHER A FIRST TRANSCEIVER OF ONE OR MORE TRANSCEIVERS IN ACCORDANCE WITH A FIRST RADIO ACCESS TECHNOLOGY (RAT) IS ABLE TO TRANSMIT A PACKET VIA A FIRST FREQUENCY BAND WITHIN A TIME PERIOD BASED AT LEAST ON A FIRST COEXISTENCE RULE, WHEREIN THE FIRST COEXISTENCE RULE CORRESPONDS TO AN IMPACT ON THE SPS RECEIVER BY OPERATION OF AT LEAST THE FIRST RAT ON THE AT LEAST THE FIRST TRANSCEIVER

1004

TRANSMIT THE PACKET VIA A SECOND FREQUENCY BAND IN ACCORDANCE WITH A SECOND RAT BASED ON THE DETERMINATION THAT THE FIRST TRANSCEIVER IN ACCORDANCE WITH THE FIRST RAT IS NOT ABLE TO TRANSMIT THE PACKET VIA A FIRST FREQUENCY BAND WITHIN THE TIME PERIOD

MULTI-CARRIER THROUGHPUT ENHANCEMENT BY OPPORTUNISTIC PACKET SCHEDULING WITH SPS CONCURRENCY

CROSS-REFERENCE TO RELATED APPLICATIONS

This application is a continuation of U.S. application Ser. No. 14/863,089, entitled "Multi-Carrier Throughput Enhancement By Opportunistic Packet Scheduling With SPS Concurrency," filed Sep. 23, 2015 which claims priority to U.S. Provisional Application No. 62/209,234, entitled "Multi-Carrier Throughput Enhancement By Opportunistic Packet Scheduling With GNSS Concurrency," filed Aug. 24, 2015, which are both expressly incorporated by reference herein in their entireties.

TECHNICAL FIELD

The present application relates generally to wireless communications, and more particularly to enhancement of throughput in multi-carrier systems with satellite positioning system (SPS) concurrency.

BACKGROUND

When a radio access technology (RAT) transceiver is transmitting data wirelessly via an antenna, a satellite positioning system (SPS) receiver located on the same device may or may not be able to process received SPS signals for performing a location determination. When transmitting, a RAT transceiver may, in some situations, produce a sufficient amount of noise and/or interference that negatively affects the ability of the SPS receiver to properly receive and process SPS signals. As a result, performance of the collocated SPS receiver is degraded during the time that the RAT transceiver is transmitting. The SPS receiver may be instructed to blank or otherwise ignore SPS signals received while the RAT transceiver is transmitting. Such arrangements may result in significant periods of time during which a location determination cannot be performed by the SPS receiver or is severely compromised. Such an occurrence may be exacerbated if multiple RAT transceivers are present on the device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A through 3C illustrate example scheduling of resources between SPS receiver and wireless local area network (WLAN) while WWAN (wireless wide area network) is concurrently operating and causing WWAN and WLAN intermodulation desense to SPS, according to one embodiment of the present disclosure.

FIGS. 6A through 6C illustrate benefits of the methods illustrated in FIGS. 5A through 5C on the SPS receiver, according to one embodiment of the present disclosure.

FIG. 6D illustrates an example scheduling scenario for coexistence of an SPS receiver with one or more RAT transceivers.

FIGS. 8A through 8C illustrate scheduling solutions for coexistence of an SPS receiver with one or more RAT transceivers, according to one embodiment of the present disclosure.

FIGS. 9A through 9C illustrate benefits of the methods illustrated in FIGS. 5A through 5C on the SPS receiver, according to one embodiment of the present disclosure.

FIG. 9D illustrates an example scheduling scenario for coexistence of an SPS receiver with one or more RAT transceivers.

FIG. 10 illustrates an embodiment of a method for managing the coexistence of an SPS receiver with one or more RAT transceivers, according to one embodiment of the present disclosure.

SUMMARY

Figure 1:
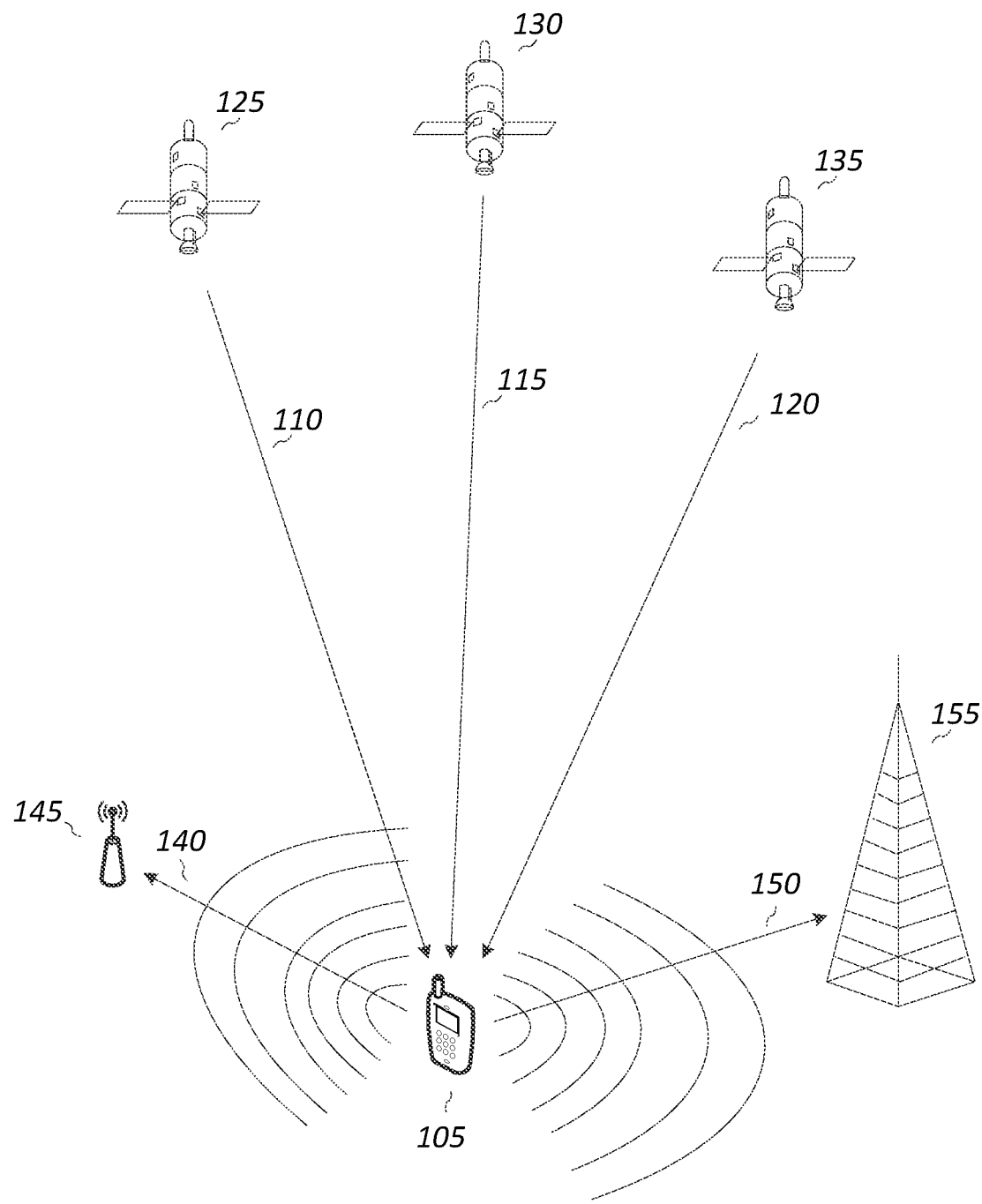
FIG. 1 illustrates a simplified diagram of an environment in which reception of satellite positioning system (SPS) signals by the mobile device may be desensed during transmission of wireless signals by the mobile device, according to one embodiment of the present disclosure.

In one example, a method for managing coexistence of a satellite positioning system (SPS) receiver with one or more transceivers is disclosed. The method includes, in part, determining whether a first transceiver of the one or more transceivers in accordance with a first Radio Access Technology (RAT) is able to transmit a packet via a first frequency band within a time period based at least on a first coexistence rule. The first coexistence rule corresponds to an impact on the SPS receiver by operation of at least the first RAT on the at least the first transceiver. The device transmits the packet via a second frequency band in accordance with a second RAT based on the determination that the first transceiver in accordance with the first RAT is not able to transmit the packet via a first frequency band within the time period.

In one example, the first RAT is a primary RAT for transmissions by the first transceiver. As an example, the device may transmit one or more packets on the first RAT based on the first coexistence rule and transmit other packets on the second RAT.

In one example, the operation of the at least the first RAT on the at least the first transceiver contributes to an interference.

In one example, the second RAT corresponds to a second coexistence rule corresponding to an impact on the SPS receiver by operation of at least a second transceiver in accordance with the second RAT.

In one example, the first RAT and the second RAT correspond to a common type of wireless network. The first frequency band may be different from the second frequency band. For example, the first RAT and the second RAT may be WLAN. The first RAT may use the 2.4 GHz frequency band and the second RAT may use the 5 MHz frequency band. In general, a common type of wireless network may refer to a wireless network of a particular type of technology. For example, a common type of wireless network may be WWAN, WLAN or any other type of wireless network. A common type of wireless network may also be particular generation of a wireless network technology. A common type of wireless network may be code division multiple access (CDMA), wideband code division multiple access (WCDMA), high speed packet access (HSPA), HSPA+, and the like. In another example, a common type of wireless network may be 802.11ac, 802.11ad, 802.11n, or any other type of network. A wireless network may also be a cellular or a non-cellular network.

The term cellular is used herein to refer to any cellular technologies corresponding to interactions between mobile devices and base stations (e.g., long term evolution (LTE), Worldwide Interoperability for Microwave Access (WiMax), Global System for Mobile Communications (GSM), WCDMA, CDMA, and the like). The term non-cellular is used herein to refer to any wired or wireless technology that does not use a cellular topology, such as WLAN, Bluetooth, and the like.

In one example, the first RAT and the second RAT correspond to WLAN, while operating on different frequency bands. A second transceiver may also be concurrently operating corresponding to a third RAT (e.g., WWAN). In another example, the first and the second RATs are WWAN that operate on different frequencies, a third RAT (e.g., WLAN) may also be considered that operates concurrently with the first and/or the second RAT. Any other scenario may also be considered without departing from the teachings of the present disclosure. It should be noted that each of the transceivers may be capable of operation in accordance with one or more RATs. For example, the first transceiver may be able to operate using WLAN1, or WLAN2. A second transceiver may be able to operate using WWAN. In another example, a first transceiver may be able to operate using WLAN1, a second transceiver may be able to operate using WLAN2 and a third transceiver may be able to operate using WWAN. In general, any number of transceivers may exist in a device. In addition, each of the transceivers may be able to operate using one or more RATs without departing from the teachings of the present disclosure.

In one example, the first coexistence rule corresponds to an impact on the SPS receiver by concurrent operation of the first transceiver using the first RAT and a second transceiver using a third RAT. For example, the first RAT is WLAN and the third RAT is WWAN. In one example, the method further includes, in part, selecting the second RAT from among one or more RATs for transmission of the packet.

In one example, an apparatus for managing coexistence is disclosed. The apparatus includes, in part, a satellite positioning system (SPS) receiver, one or more transceivers, a memory, at least one processor coupled to the SPS receiver, the one or more transceivers and the memory. The at least one processor is configured to determine whether a first transceiver of the one or more transceivers in accordance with a first Radio Access Technology (RAT) is able to transmit a packet via a first frequency band within a time period based at least on a first coexistence rule. The first coexistence rule corresponds to an impact on the SPS receiver by operation of at least the first RAT on the at least the first transceiver. The at least one processor is further configured to transmit the packet via a second frequency band in accordance with a second RAT based on the determination that the first transceiver in accordance with the first RAT is not able to transmit the packet via a first frequency band within the time period.

In one example, an apparatus for managing coexistence of a SPS receiver with one or more transceivers is disclosed. The apparatus includes, in part, means for obtaining a packet to be transmitted, means for determining whether a first transceiver of the one or more transceivers in accordance with a first Radio Access Technology (RAT) is able to transmit a packet via a first frequency band within a time period based at least on a first coexistence rule. The first coexistence rule corresponds to an impact on the SPS receiver by operation of at least the first RAT on the at least the first transceiver. The apparatus further includes, in part, means for transmitting the packet via a second frequency band in accordance with a second RAT based on the determination that the first transceiver in accordance with the first RAT is not able to transmit the packet via a first frequency band within the time period.

In one example, a non-transitory processor-readable medium for managing coexistence of a SPS receiver with one or more transceivers is disclosed. The non-transitory processor-readable medium includes processor-readable instructions configured to cause one or more processors to determine whether a first transceiver of the one or more transceivers in accordance with a first Radio Access Technology (RAT) is able to transmit a packet via a first frequency band within a time period based at least on a first coexistence rule. The first coexistence rule corresponds to an impact on the SPS receiver by operation of at least the first RAT on the at least the first transceiver. The processor-readable instructions are further configured to cause one or more processors to transmit the packet via a second frequency band in accordance with a second RAT based on the determination that the first transceiver in accordance with the first RAT is not able to transmit the packet via a first frequency band within the time period.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The term Radio Access Technology (RAT) is used herein to refer to any type of radio technologies used to transmit/receive signals, including but not limited to wireless wide area network (WWAN), wireless local area network (WLAN), personal area network (PAN), and the like.

The term Satellite Positioning System (SPS) is used herein to refer to various types of satellite positioning systems, including different Global Navigation Satellite Systems (GNSS), and/or regional positioning systems. For example, the SPS system may be a Global Positioning System (GPS), Global Navigation Satellite System (GLONASS), Galileo, Beidou, and/or other type of satellite positioning system. In general, the SPS system may be one or more of these different types of systems used either alone or in conjunction with one another.

The term "transceiver" is used herein to refer to a transmitter and/or receiver capable of operating under one or more radio access technologies. In one embodiment, one or more transceivers may share some of their components (e.g., baseband components). In one embodiment, a transceiver may have one or more radio frequency (RF) chains, each corresponding to similar or different RATs. Any other combination of components in a transceiver may be possible without departing from the teachings of the present disclosure.

A common problem encountered by a mobile device having wireless communication capabilities as well as SPS capabilities is the coexistence of wireless communication and SPS systems within the mobile device. In particular, interference or "desensing," can occur when a mobile device attempts to simultaneously transmit wireless signals and receive SPS signals. The transmission of the wireless signals and/or an intermodulation product arising from such transmissions can lead to interference that impacts the proper reception of the SPS signals. For example, the interference may cause a failure to acquire one or more of the SPS signals, corruption of the SPS signals, reduction in the number/frequency of successfully received SPS signals such that SPS-based positioning is degraded, etc. Embodiments of the present invention are directed to managing transmission of wireless signals and reception of the SPS signals by the mobile device in order to address such "desensing" issues.

Single or multiple concurrent RAT transmissions (e.g., WLAN and/or long term evolution (LTE)) cause SPS (e.g., GNSS) desense issues for co-located multi-radio mobile devices. For example, concurrent operation of 2.4 GHz WLAN and 800 MHz WAN may result in intermodulation products (IM2) in GNSS band (2.4 GHz-800 MHz=1600 MHz in GNSS L1). In another example, concurrent operation of 5 GHz WLAN and 1700 MHz WAN may result in intermodulation products (IM3) in GNSS band (5 GHz-2× 1700 MHz=1600 MHz in GNSS L1). In yet another example, Carrier Aggregation (2×UL CA) LTE/WWAN 800 MHz+1700 MHz and 2.4 GHz+5 GHz WLAN Dual Band Simultaneous (DBS) may result in intermodulation products in GNSS band (2.4 GHz-800 MHz & 5 GHz-2×1700 MHz=1600 MHz in GNSS L1).

To mitigate SPS desense issues caused by intermodulation (IM) interference, current methods in the art perform SPS blanking along with WLAN duty cycle limiting. However, these methods lead to compromised performance on both WLAN and SPS during concurrent operation.

In general, SPS RX blanking is performed when concurrent operation of WLAN and WWAN results in intermodulation (IM) products that desense SPS operation. In SPS receiver blanking method, SPS correlation is inhibited during these RAT TX events. For example, sample memory may be zeroed out, and/or automatic gain control (AGC) may be frozen.

Currently, in order to maintain SPS operation (with some sensitivity loss), WLAN is duty cycled. WLAN duty cycle (TX active) is usually required to be less than 50% over any predefined (e.g., 20 milliseconds) decision unit interval to ensure correct operation of the SPS receiver. Duty-cycle limiting schemes require WLAN packet scheduling modifications, which degrade the WLAN throughput by up to one half.

FIG. 1 illustrates a simplified diagram of an environment 100 in which reception of SPS signals by the mobile device may be desensed during transmission of wireless signals by the mobile device. As shown, environment 100 includes a mobile device 105. Mobile device 105 may be a device designed to perform numerous functions, including the ability to determine its own location based on the reception of SPS signals from satellites.

Mobile device 105 is able to perform satellite-based positioning by receiving SPS signals from one or more satellites. Such satellite-based positioning techniques are well-known and only briefly described below. As shown here, mobile device 105 receives SPS signals 110, 115, and 120 from satellites 125, 130, and 135, respectively. Typically, each of the SPS signals 110, 115, and 120 would include timing information relating to when the SPS signal was transmitted from the respective satellite. Each SPS signal may also include ephemeris information which can be used to determine the location of the satellite at the time the SPS signal is transmitted. Mobile device 105 is able to determine when it receives each of the SPS signals 110, 115, and 120. The transmission time and reception time of each SPS signal may be aligned on a common timing reference, such as a common clock, known to the mobile device 105. By taking the difference between the reception time and transmission time, mobile device 105 may compute the "flight time" associated with each SPS signal, for it to travel from the respective satellite to mobile device 105. The flight time can then be used to compute the distance between each satellite and mobile device, taking into account the speed of light. Once the distance between each satellite and the mobile device is found, trilateration may be used to compute the location of mobile device 105, based on the known location of each satellite and the distance between each satellite and mobile device 105.

In addition to satellite-based positioning, a significant category of functions performed by mobile device 105 relates to wireless communications. Wireless communications may serve as an important link in connecting mobile device 105 over private and/or public networks with other devices such as servers and other user equipment. This may include communication over various types of wireless networks, including wireless local area networks (WLAN) and wide area networks (WAN), among others. Examples of WLANs may be different types of Wi-Fi networks, such as those implemented based on various 802.11 standards. The example in FIG. 1 focuses on wireless communications between mobile devices and base stations. However, other examples of wireless communications may include peer-to-peer communications between mobile devices such as Wi-Fi Direct, Long-Term Evolution (LTE) Direct, etc. Examples of WWAN RATs may include LTE, wideband code division multiple access (WCDMA), and the like. Additional examples of wireless communications may include near field communications (NFC), Bluetooth communications, etc. Embodiments of the present invention, including selection of radio access technologies (RATs) and/or control of transmission of wireless signals to avoid "desensing," may be implemented with different types of wireless communication signals.

In the example shown in FIG. 1, mobile device 105 is able to perform wireless communications by sending signals to, and receiving signals from, one or more base stations 155.

For instance, mobile device 105 may send a WLAN signal 140 to a local area transmitter 145, which may be a base station supporting WLAN communications. In general, the local area transmitter may be an access point, a beacon or any combination thereof. The local area transmitter may operate under WLAN, Bluetooth, or any other radio technology.

Mobile device 105 may send a WWAN signal 150 to cell tower 155, which may be a base station supporting WWAN communications. For instance, WLAN signal 140 and/or WWAN signal 150 transmitted by mobile device 105 may include an HTTP request for a web page the user of mobile device 105 may wish to retrieve from the Internet. Not shown in FIG. 1 are the wireless signals that mobile device 105 may receive back in response to the request. For example, such signals may be sent to mobile device 105 from local area transmitter 145 and/or cell tower 155 and may include an HTTP response containing the HTML file constituting the requested web page. FIG. 1 highlights the wireless signals transmitted from mobile device 105 (as opposed to wireless signals received by mobile device 105), because various embodiments of the present invention addresses techniques to control the scheduling of wireless signal transmissions from the mobile device, to reduce interference caused by such transmitted signals.

For example, if mobile device 105 simultaneously attempts to receive SPS signals such as 110, 115, and 120 and transmit wireless signals such as 140 and 150, interference may occur to "desense" the proper reception of the SPS signals. This can occur if received SPS signals 110, 115, and 120 and transmitted wireless signals 140 and 150 utilize common or overlapping frequencies. The interference may also be caused by spectral emissions from adjacent or close frequency bands. This can also occur even when received SPS signals 110, 115, and 120 and transmitted wireless signals 140 and 150 do not utilize common or overlapping frequencies, but intermodulation products introduce interference.

In general, many factors may affect whether a RAT transceiver's transmissions cause substantial interference with the reception of SPS signals by an SPS receiver. In some situations, the frequency being used by the RAT transceiver may cause little or no interference with the SPS receiver. In some situations, the RAT transceiver may be transmitting at a low enough power that the RAT transceiver may cause little or no interference with the SPS receiver. In other situations, the RAT transceiver's spectral emissions or harmonics may cause interference with the SPS receiver. When multiple RAT transceivers of a device are transmitting at a same time, various harmonic and/or intermodulation frequencies may be created that can cause interference with the SPS receiver (as described above).

Figure 2:
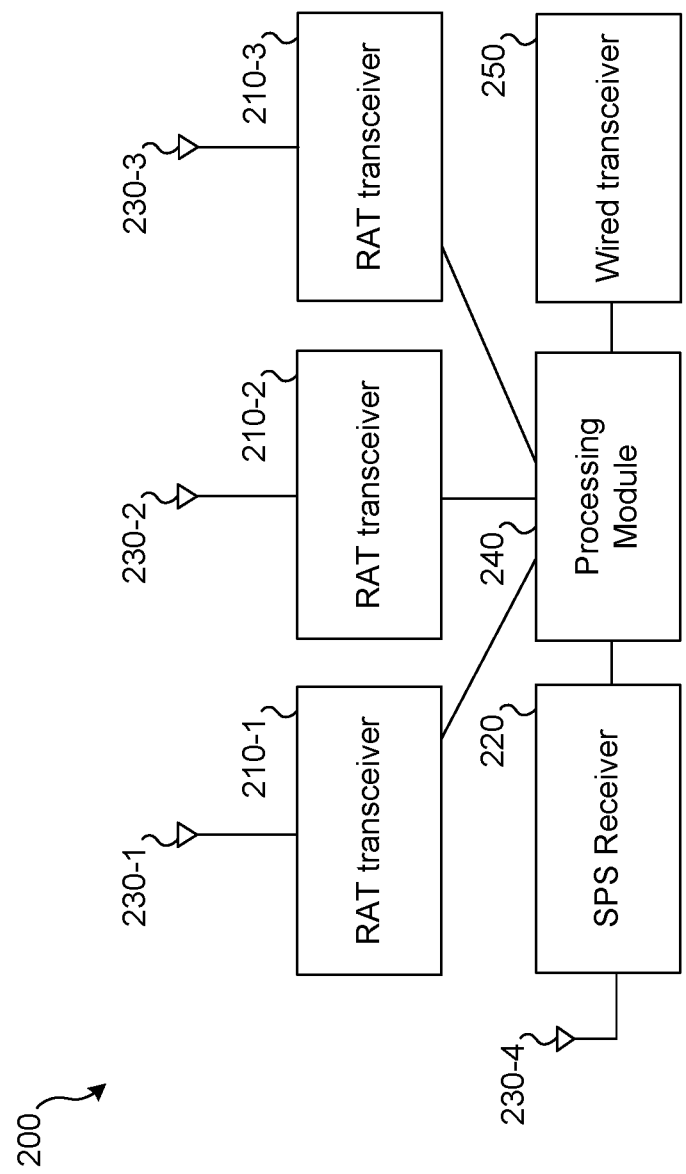
FIG. 2 illustrates an embodiment of a device that includes an SPS receiver and multiple radio access technology (RAT) transceivers, according to one embodiment of the present disclosure.

FIG. 2 illustrates a device 200 that includes an SPS receiver and multiple RAT transceivers. Device 200 includes three RAT transceivers 210-1, 210-2, and 210-3, SPS receiver 220, antennas 230-1, 230-2, 230-3, and 230-4, processor 240, and wired transceiver 250. Device 200 may be a mobile, wireless device, a cellular telephone, a tablet computer, an Internet of Things (IoT) device, a wearable computing device, an automobile, an automotive device, a dedicated SPS receiver device (e.g., a car navigation device) or any other device that is capable of determining its position using an SPS receiver and communicating via one or more RAT transceivers.

In device 200, three RAT transceivers 210 are present. At various times, each of these RAT transceivers 210 may transmit signals wirelessly via associated antennas 230. RAT transceivers 210 may be transmitting while no other RAT transceiver is transmitting or may transmit concurrently while one or more other RAT transceivers of RAT transceivers 210 are transmitting. Therefore, at a given time, zero, one, or more than one RAT transceivers of RAT transceivers 210 may be transmitting wireless signals.

Each of RAT transceivers 210 may correspond to at least one wireless technology/protocol. For example, RAT transceiver 210-1 may correspond to one or more of cellular communication protocols, such as 4G LTE, 3G, or GSM. RAT transceiver 210-2 may correspond to one or more wireless local area network protocols such as 802.11a/b/g/ac/ad. RAT transceiver 210-3 may correspond to a device-to-device communication technology/protocol, such as Bluetooth®. In some embodiments, one or more RAT transceivers may correspond to the same technology/protocol. In some embodiments, each of the transceivers may support multiple protocols (e.g., cellular communication protocols, wireless local area network protocols, device-to-device or any other protocols.) While the illustrated embodiment of device 200 contains three RAT transceivers, it should be understood that this is for illustration purposes only; one, two, or more than three RAT transceivers may be present in alternate embodiments of device 200.

Each of RAT transceivers 210 may be associated with an antenna. RAT transceiver 210-1 may use antenna 230-1 to transmit (and, possibly, receive) wireless signals; RAT transceiver 210-2 may use antenna 230-2 to transmit (and, possibly, receive) wireless signals; and RAT transceiver 210-3 may use antenna 230-3 to transmit (and, possibly, receive) wireless signals. In some embodiments, two or more RAT transceivers of RAT transceivers 210 may share a single antenna. Also, one or more RAT transceivers of RAT transceivers 210 may transmit using two or more antennas. A RAT transceiver of RAT transceivers 210 may be permitted to switch transmission from a first antenna to a second antenna. In some embodiments, it may also be possible that SPS receiver 220 may share an antenna with one or more RAT transceivers 210.

RAT transceivers 210 may be in communication with processor 240. The processor may be an application processor, baseband processor, and/or any other type of processor. Data may be received from processor 240 for transmission and received data may be provided to processor 240. Processor 240 may represent one or more processors in communication with non-transitory processor-readable memory. Processor 240 may be responsible for execution of a high-level operating system (HLOS) and/or the execution of one or more applications that use one or more RAT transceivers of RAT transceivers 210 to transmit data and/or uses locations determined by SPS receiver 220.

SPS receiver 220 may be a standalone component (e.g., a separate integrated circuit chip, such as a radio frequency (RF) chip) or may be a part of a processor 240. For instance, some processors can have an SPS receiver onboard. Whether integrated into a multi-purpose processor or a standalone component, SPS receiver 220 is capable of determining its position based on received SPS signals. Such SPS signals may be received via antenna 230-4. Antenna 230-4 may be dedicated to SPS receiver 220 or may be shared with one or more other components, such as one or more of RAT transceivers 210.

Any of RAT transceivers 210 transmitting may or may not interfere with successful reception and processing of SPS signals by SPS receiver 220. Whether any or sufficient interference occurs to affect the performance (e.g., reception and processing) of SPS receiver 220 may be dependent on various operating characteristics of each RAT transceiver: the frequency on which the RAT transceiver is transmitting, the power level at which the RAT transceiver is transmitting, and/or which antenna the RAT transceiver is using. When two or more RAT transceivers of RAT transceivers 210 are transmitting concurrently, interference at one or more harmonic or intermodulation frequencies may be created that otherwise would not exist. Interference at such frequencies may not be created if each of the RAT transceivers transmitting was transmitting during a different time period. Moreover, transmissions from each of the RAT transceivers may result in interference at harmonics of their transmission frequency.

In addition to interference being caused by RAT transceivers 210, interference on the SPS receiver may be caused by one or more wired transceivers, such as wired transceiver 250. A wired transceiver 250 may be configured to transmit and/or receive data via a connected wire, such as via a USB3 wired connector and protocol. While a single wired transceiver 250 is depicted in FIG. 2, it should be understood that no wired transceivers or more than one wired transceiver may be present. Wired transceiver 250 may be in communication with processor 240. Data may be received from processor 240 for transmission and received data may be provided to processor 240.

Embodiments detailed herein may be applicable when no RAT transceivers are present or operating. In such embodiments, interference may be caused by other sources, such as power supplies, external devices, and/or other internal componentry.

Whether or not any or sufficient interference occurs to affect the performance of SPS receiver 220 may be further dependent on the current operating characteristics of SPS receiver 220. The proximity (distance) between SPS receiver 220 (and antenna 230-4) to the SPS space vehicles (SVs) from which SPS signals are being received and processed may affect how much interference can be tolerated. The SPS constellation and/or the specific SVs within the constellation being used may affect how interference affects the SPS receiver because of different frequencies, power levels, SV health, obstructions (due to the direction of the constellation's SVs in relation to the SPS receiver), and/or orthogonality scheme.

FIGS. 3A through 3C illustrate example scheduling of resources between SPS receiver and WLAN transceiver, with duty cycle limitations. In these examples, duty cycle of each radio is time-shared, and can only increase at the expense of decreasing duty cycle of the other radio, leading to compromised performance. As illustrated in FIG. 3A, WLAN and SPS both have 50% duty cycle. Therefore, WLAN TX 302 utilizes up to 50% of each time interval ($T_1$ 316). The SPS receiver is blanked in the first half of the time interval $T_1$, and is actively receiving signals in the second half of the time interval $T_1$ (e.g., SPS ON 304).

In FIG. 3B, WLAN transceiver has higher priority over SPS receiver, allowing a higher duty cycle for the WLAN. Therefore, WLAN TX 306 covers more than half of the time interval T2. The SPS receiver is actively receiving signals in the rest of the time interval $T_2$ (e.g., SPS ON 308).

In FIG. 3C, SPS receiver has a higher priority over WLAN transceiver, allowing a higher duty cycle for the SPS receiver. In this example, WLAN TX 310 covers less than half of the time interval T3. And, the SPS receiver is actively receiving signals in more than half or the time interval $T_3$ (e.g., SPS ON 3312).

Figure 4:
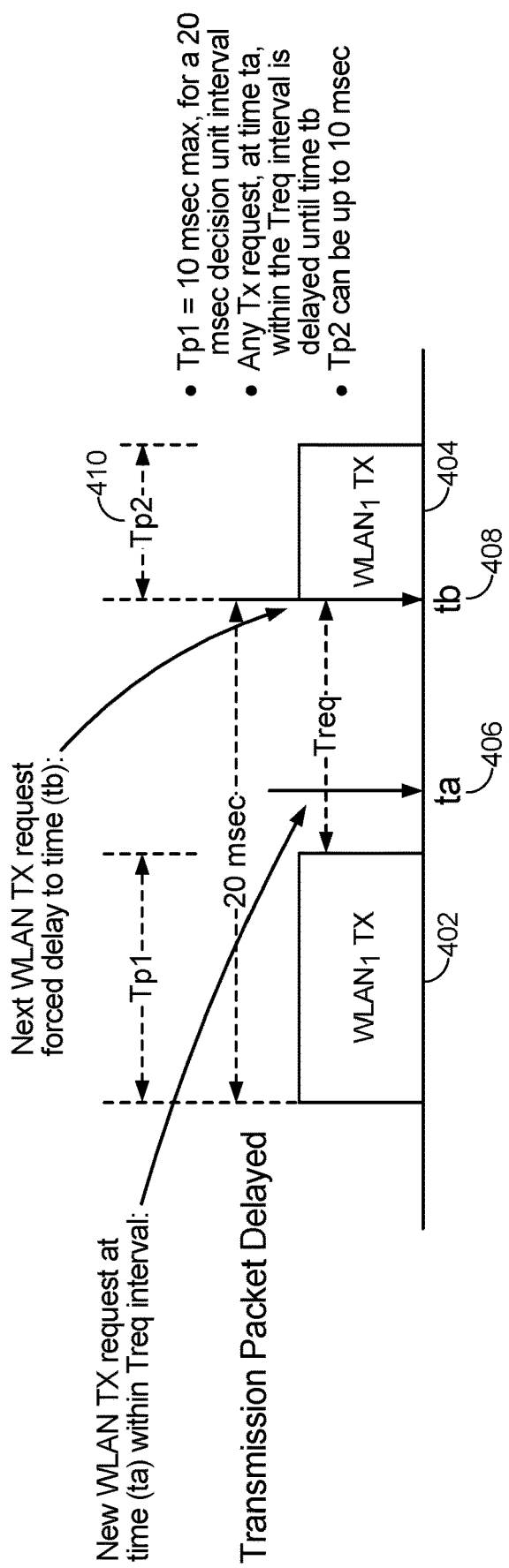
FIG. 4 illustrates an example scheduling scenario, in which transmission packet is delayed, according to one embodiment of the present disclosure.

FIG. 4 illustrates an example scheduling scenario, in which transmission packet is delayed, according to one embodiment of the present disclosure. In this example, Tp1=10 msec max, for a 20 msec decision unit interval corresponding to a 50% duty cycle rule for WLAN which is concurrent with another WWAN causing IM desense to SPS. It should be noted that in the following examples, it is assumed the "decision unit interval", or "time interval T" is 20 msec, however, in general, any number of milliseconds can be considered for these time intervals without departing from the teachings of the present disclosure. Any transmission mo request (e.g., at time to 406) within the Treq interval is delayed until time tb 408. In this example, Tp2 410 (time duration for WLAN1 transmission 404) can be up to 10 msec, due to duty cycle limitation rules that are in effect.

Figure 7:
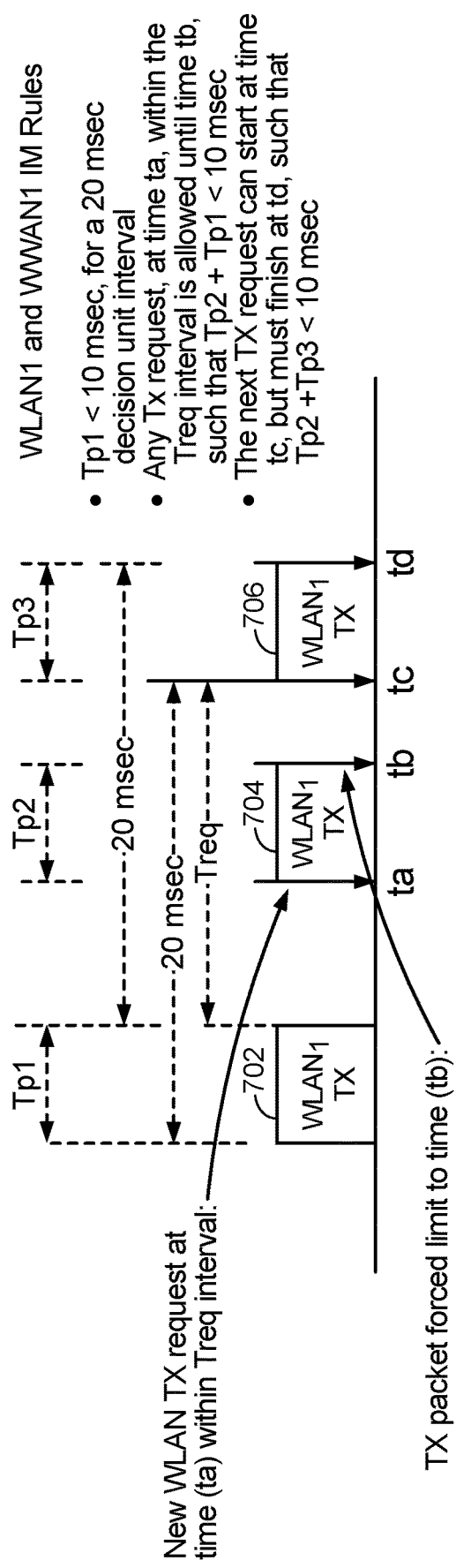
FIG. 7 illustrates an example scheduling scenario for coexistence of an SPS receiver with one or more RAT transceivers, in which transmission packet is limited, according to one embodiment of the present disclosure.

In one example, the WLAN duty cycle rule may be applied to the WLAN operation as follows: At the start of a WLAN TX event (e.g., 404), check if a prior WLAN TX event (e.g., 402) has lasted more than 10 msec over the previous 20 msec time duration. If the prior WLAN TX event (e.g., 402) has lasted more than 10 msec over the previous 20 msec, then WLAN TX needs to be delayed until the next TX opportunity that satisfies the 50% rule is reached (as illustrated in FIG. 4). If the prior WLAN TX event (e.g., 402) has not lasted more than 10 msec over the previous 20 msec, then WLAN transmission is allowed. However, duration of the transmission event must be limited to satisfy the 50% duty cycle rule over the last 20 msec (as illustrated in FIG. 7).

Certain embodiments increase throughput of different RAT transceivers (e.g., LTE, WWAN, WLAN, etc.) by opportunistic packet scheduling with SPS concurrency. In one embodiment, instead of enforcing the duty cycle limiting rule for a transceiver (which limits throughput), traffic packets corresponding to that transceiver are opportunistically scheduled depending on the offending coexistence scenario with other transceivers, For example, instead of enforcing the duty cycle limiting rule for WLAN, traffic packets corresponding to WLAN are opportunistically scheduled depending on the offending coexistence scenario with LTE and/or WWAN. The solution described herein avoids packet delay latency and/or artificially limiting packet duration of the transceivers.

One embodiment allows multiple TX concurrency e.g., LTE with N times uplink carrier aggregation with N=1, 2, . . . 5 or more (NxUL CA) and/or dual SIM dual active (DSDA), with WLAN, whose interference to SPS is not handled by the current prior art blanking techniques.

As described herein, a multi-radio device may include a plurality of radios, such as WWAN, WLAN, SPS, and the like. Operation of the various radios may be coordinated to allow coexistence and cooperation amongst them based on their operating parameters. The opportunistic scheduling technique, as described herein, has several technical advantages, such as increasing WLAN throughput by avoiding packet delay latency and/or artificially limiting the WLAN packet duration. In addition, SPS sensitivity is improved, leading to shorter time to first fix (TTFF) and better positional accuracy. For example, blanking requirement may be reduced by eliminating some problematic TX RAT intermodulation events. In addition, opportunistic scheduling technique enhances multi-carrier throughput with less compromised performance on SPS and WLAN. For example, WWAN NxUL CA and/or dual-SIM dual-active (DSDA) can be allowed to operate concurrently with SPS and WLAN. Other multi-carrier scenarios may include multi-transmitter WWAN such as LTE uplink carrier aggregation (UL CA) (e.g., 2×UL CA already implemented, up to 5×UL CA will be supported in the future), Dual SIM Dual Active (DSDA, such as L/T/G+G, L/W/G+G, L/DO/1x+G, and the like), SGLTE/SGTDS, Simultaneous 1x and LTE (SGLTE), and the like. Here, L stands for LTE, W stands for WCDMA, T stands for TD-SCDMA, G stands for GSM, 1x stands for CDMA2000 1xRTT voice, DO stands for CDMA2000 1x Evolution-Data Optimized, TDS stands for TD-SCDMA, SGLTE stands for simultaneous GERAN (GSM/EDGE) and LTE, SGTDS stands for simultaneous GERAN and TDS. In addition, multi-carrier WLAN may include Dual Band Simultaneous (DBS) (e.g., 802.11a/b/g/n/ac in 2.4 GHz and 5 GHz), Triple Band Simultaneous (TBS) (e.g., 802.11a/b/g/n/ac in 2.4 GHz, 5 GHz and 802.11ad in 60 GHz) or any other future WLAN bands, such as 802.11ah 900 MHz; 3.5 GHz; WLAN in the TV white space bands 54-790 MHz.

Figure 5A:
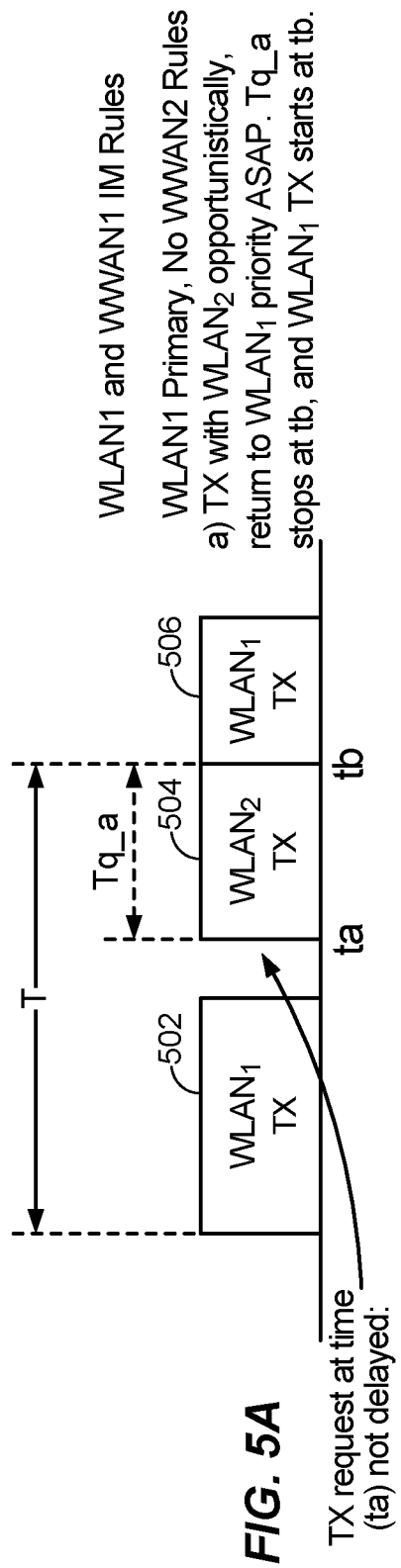
FIGS. 5A through 5C illustrate example scheduling scenarios for coexistence of an SPS receiver with one or more RAT transceivers, according to one embodiment of the present disclosure.
Figure 5B:
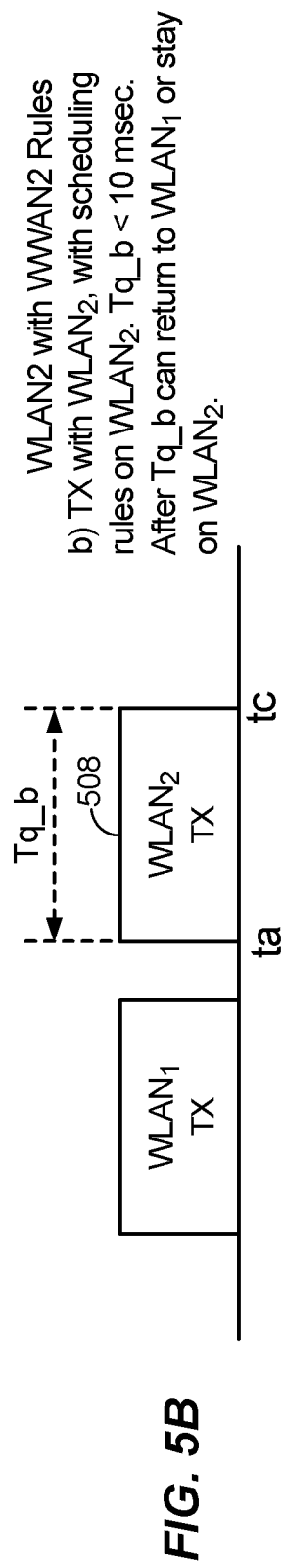
Figure 5C:
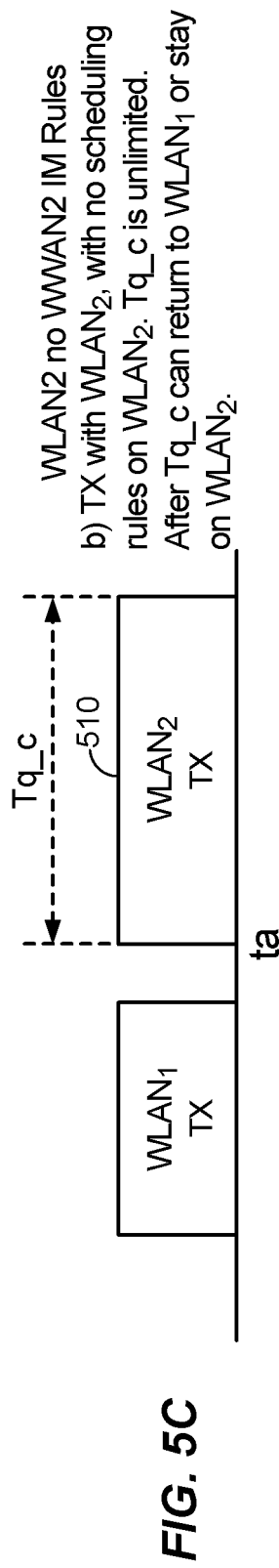

FIGS. 5A through 5C illustrate example scheduling scenarios for coexistence of an SPS receiver with one or more RAT transceivers, according to embodiments of the present disclosure. One or more methods described herein allow both the SPS and the WLAN to increase their performance compared to other known methods in the art. In one embodiment, priorities of SPS and WLAN do not need to be considered.

In a first scenario (as illustrated in FIG. 5A), WLAN1 is primary, and WLAN2 is used opportunistically. In general, WLAN1 may be considered primary over WLAN2 due to operator preferences, power consumption of the radios, throughput/coverage benefits of the particular WLAN band, interference loading of the bands, cross-RAT coexistence issues, etc., or there could be a CA/DSDA and/or DBS coexistence issue with WLAN2. In this example, WLAN1 is under duty cycle limitations. Therefore, WLAN1 TX can operate on a portion 502 of time interval T. For example, if there is a 50% duty cycle rule on WLAN1, WLAN1 TX can cover up to 50% of the time interval T. In one embodiment, when WLAN1 is not operating, WLAN2 TX 504 can be scheduled opportunistically. In this example, since WLAN1 is primary, the device returns to WLAN1 operation as soon as the duty cycle scheduling rules on WLAN1 allow. For example, at time tb, the device stops operating on WLAN2 and returns to WLAN1 operation (e.g., WLAN TX 506).

As an example, LTE1+LTE2 uplink carrier aggregation (UL CA), or GSM1+LTE2 Dual SIM Dual Active (DSDA) may be considered. The scenario shown in FIG. 5A also applies if WWAN2 is not used, or WWAN2 is at another frequency band besides 1700 MHz that does not cause an IM interference on the SPS receiver while concurrently operating with WLAN2 at 5 GHz.

In a second scenario (as illustrated in FIG. 5B), the device schedules on WLAN2 opportunistically. In this example, there is a WLAN2/SPS duty cycle coexistence rule in effect (Tq_b<10 msec if T=20 msec). In this example, IM products from WLAN2/WWAN operation affect operation of SPS receiver. In this scenario, after WLAN2 TX packet is sent, the device can return to WLAN1 operation immediately after 508 or stay on WLAN2 (but if stay on WLAN2, the next opportunity to TX will have to wait to satisfy the duty cycle rule on WLAN2). In one example, the device can stay on WLAN2 for up to 10 msec, to satisfy the duty cycle rule on WLAN2.

In a third scenario (as illustrated in FIG. 5C), the device schedules on WLAN2 opportunistically. In this example, there is no WLAN2/SPS duty cycle coexistence rule in effect (e.g., Tq_c is unlimited). Therefore, after WLAN2 TX packet is sent, the device can return to WLAN1 operation or stay on WLAN2 (as shown in FIG. 5B, WLAN2 TX 510). In all of the three scenarios shown in FIGS. 5A, 5B and 5C, WLAN throughput is increased over non-opportunistic scheduling techniques known in the art.

FIGS. 6A through 6C illustrate benefits of the methods illustrated in FIGS. 5A through 5C on the SPS receiver, according to one embodiment of the present disclosure. FIG. 6D illustrates an example scheduling scenario for coexistence of an SPS receiver with a WLAN1 transceiver. In scenarios illustrated in FIGS. 6A through 6C, priorities of SPS and WLAN do not need to be considered. Rather, both SPS and WLAN can increase their performance over other known techniques in the art (e.g., FIG. 6D).

In FIG. 6A, concurrent operation of WLAN2 with SPS receiver does not cause any interference on the SPS receiver, therefore, WLAN2 is scheduled opportunistically when possible. In this example, the WLAN system throughput is increased up to 100%, while SPS blanking is not degraded over other methods known in the art, remaining at 50% utilization (e.g., as shown in FIG. 6D). Throughput of the system is increased since the device is able to operate on WLAN2 any time that is unable to operate on WLAN1. For example, at a given time, the device may not be allowed to operate on WLAN1 due to duty cycle limitation rules that are in effect on the WLAN1, however, the device may be able to schedule WLAN traffic on WLAN2, which does not cause any interference on the SPS receiver.

In the scenario illustrated in FIG. 6B, which corresponds to the scenario illustrated in FIG. 5B, the WLAN system throughput is increased by opportunistically scheduling on WLAN2. This scenario can be considered as a multi-carrier WWAN use case. As an example, this could correspond to WLAN1=2.4 GHz, WLAN2=5 GHz, LTE1=800 MHz, LTE2=1700 MHz. In one embodiment, both WLAN1 and WLAN2 have IM duty cycle rules, therefore, GNSS operation will be blanked for both TX events. In this scenario, a comparison with the prior art, 6D, is not applicable since 6D does not apply to LTE1 and LTE2. For GNSS operation in this case, it would depend on if the mobile supported WLAN dual band simultaneous (DBS) capability, or just one band at a time (meaning either 2.4 GHz or 5 GHz). If the mobile device supports one WLAN band at a time (as may be the case if there is only one WLAN antenna), then GNSS operation will only be allowed in the gaps. In this scenario, the 50% blanking rule is likely to be violated. On the other hand, if the mobile device supports DBS (e.g., two WLAN antennas), GNSS concurrency is maximized to 50% by synchronizing WLAN1 and WLAN2 transmissions.

In the scenario illustrated in FIG. 6C, the device can operate on WLAN2 (e.g., WLAN2 TX 610), without causing any interference on the SPS receiver. In this scenario, the SPS receiver can operate concurrently with WLAN2 transceiver. However, SPS receiver is blanked during operation of WLAN1 TX 620 (due to interference). In this case, the WLAN system throughput is increased up to 100% while SPS blanking is reduced over prior art, up to 100% utilization (e.g., 0% blanking).

FIG. 6D illustrates an example scheduling scenario for coexistence of an SPS receiver with WLAN1 transceiver as known in the art. As illustrated, transmission of WLAN1 TX causes interference on the SPS receiver, the SPS receiver needs to be blanked during WLAN1 transmission. WLAN1 operation is under duty cycle limitation (e.g., 50% in this example) and SPS utilization is at 50%.

FIG. 7 illustrates an example scheduling scenario, in which transmission packet is limited due to duty cycle limitation rules that are in effect on WLAN1. Therefore, Tp1<10 msec, for a 20 msec decision unit interval. In this example, the device may operate on WLAN1 for the duration of Tp1 (e.g., WLAN1 TX 702). Any new WLAN TX request (e.g., at time ta) within Treq interval is allowed until time tb (e.g., WLAN1 TX 704) such that Tp2+Tp1<10 msec. The next transmission request can start at time tc, but must finish at time td, such that Tp2+Tp3<10 msec (e.g., WLAN1 TX 706), because of the duty cycle limitation rule.

FIGS. 8A through 8C illustrate scheduling solutions for coexistence of an SPS receiver with one or more RAT transceivers, according to one embodiment of the present disclosure. As a non-limiting example, WLAN1 is operating at 2.4 GHz, WWAN1 is operating at 800 MHz. For the scenario shown in FIG. 8B, WWAN2 is operating at 1700 MHz. For scenarios shown in FIGS. 8A and 8C, WWAN2 does not equal 1700 MHz, but can be at another band that does not cause IM interference on the SPS receiver, or WWAN2 may not be used. In this example, WLAN2 may be scheduled at 5 GHz opportunistically. It should be noted that in general, WLAN, SPS and/or WWAN may operate on any frequency bands without departing from the teachings of the present disclosure.

In FIG. 8A, the device operates on WLAN1, which is primary over WLAN2, for example, due to operator preferences, power consumption of the radios, throughput/coverage benefits of the particular WLAN band, interference loading of the bands, cross-RAT coexistence issues, etc. In this example, WLAN1 and WWAN1 IM rules exist. However, there is no IM rule on WWAN2. The device may schedule on WLAN2 opportunistically (e.g., WLAN2 TX 802), however, it returns to WLAN1 at first opportunity (e.g., WLAN1 TX 804), because WLAN1 is primary. In this example, Tq_a stops at tc (e.g., WLAN2 TX 802), and transmission on WLAN1 starts at tc (e.g., WLAN1 TX 804).

As an example, LTE1+LTE2 uplink carrier aggregation (UL CA), or GSM1+LTE2 Dual SIM Dual Active (DSDA) may be considered. The scenario shown in FIG. 8A also applies if WWAN2 is not used, or WWAN2 is at another frequency band besides 1700 MHz that does not cause an IM interference on the SPS receiver while concurrently operating with WLAN2 at 5 GHz.

In a scenario illustrated in FIG. 8B, there are IM rules on operation of WLAN2 and WWAN2. In this example, the device may stay on WLAN2 as long as scheduling rules allow. As illustrated, there is no reason to return to WLAN1 at first opportunity. Therefore, packet duration of WLAN2 is determined by scheduling rules in effect on WLAN2. For example, the device may operate on WLAN2 until the scheduling rules on WLAN2 allow (e.g., Tq_b<10 msec). After Tq_b, the device can return to WLAN1, or stay on WLAN2. As an example, this scenario may be used in LTE1+LTE2 UL CA, or GSM1+LTE2 DSDA.

In a scenario illustrated in FIG. 8C, there are no scheduling rules in effect on WLAN2. In this case, the device can finish transmission on WLAN2 and then remain there, or go back to WLAN1 for next packet. The method described herein can still be used if WWAN2 is not used, or WWAN2 is at another band besides 1700 MHz that does not cause an IM issue with WLAN2 at 5 GHz.

In another non-limiting example, if WLAN1 is at 2.4 GHz, WWAN1 is at 800 MHz, WWAN2 is at 1700 MHz, then WLAN2 may be scheduled at 60 GHz opportunistically. In this case, there may not be WLAN2/SPS duty cycle coexistence rules in effect for WWAN at 800 and 1700 MHz. If WLAN1 is at 5 GHz, and WWAN1 at 1700 MHz, WWAN2 at 800 MHz, then the converse to the previous examples where e.g., WLAN2 is 2.4 GHz, or other bands may be considered.

In general, the opportunistic scheduling techniques described herein may be applicable to many other cases without departing from the teachings of the present disclosure. For example, WLAN may be at 900, 700, 3500 MHz, etc., and other WWAN NxUL CA or DSDA IM combinations cause interference on SPS receiver. In one embodiment, the proposed method may be used in any kind of multi-carrier scenarios. Other multi-carrier use cases may also be defined. For example, WWAN Multi-TX, such as LTE Uplink Carrier Aggregation (UL CA) (2×UL CA already implemented, up to 5×UL CA supported in future). In another example, Dual SIM Dual Active (DSDA) (L/T/G+G, L/W/G+G, L/DO/1x+G, etc.). In yet another example, SGLTE/SGTDS may be used. In another example, SVLTE may be used.

The methods described herein may be used in any kind of Multi-Carrier WLAN scenarios without departing from the teachings of the present disclosure. As an example, Dual Band Simultaneous (DBS); (e.g. 802.11a/b/g/n/ac in 2.4 GHz and 5 GHz), Triple Band Simultaneous (TBS); (e.g., 802.11a/b/g/n/ac in 2.4 GHz and 5 GHz and 802.11ad in 60 GHz), or any other future WLAN bands, such as 802.11ah 900 MHz; 3.5 GHz; WLAN in the TV white space bands 54-790 MHz, or any other band can be used.

FIGS. 9A through 9C illustrate benefits of the methods illustrated in FIGS. 8A through 8C on the SPS receiver, according to embodiments of the present disclosure. FIG. 9D illustrates an example scheduling scenario for coexistence of an SPS receiver with a WLAN transceiver.

In FIG. 9A, which corresponds to FIG. 8A, WLAN throughput is increased compared to other known schemes in the art (e.g., as illustrated in FIG. 9D), while SPS blanking is reduced compared to, for example, FIG. 9D. The WLAN throughput of the system is increased since the device is able to operate on WLAN2 any time that is unable to operate on WLAN1 (because of duty cycle limitation rules that are in effect on the WLAN1), leading to the combined WLAN1 and WLAN2 throughput utilization of up to 100%. In this example, concurrent operation of WLAN2 with SPS receiver does not cause any interference on the SPS receiver, therefore, WLAN2 is scheduled opportunistically when possible. In this example, the SPS utilization is increased over that of FIG. 9D.

As illustrated in FIG. 9B, which corresponds to FIG. 8B, the WLAN system throughput is increased compared to other known techniques such as in FIG. 9D. This scenario can be considered as a multi-carrier WWAN use case.

As illustrated in FIG. 9C, which corresponds to FIG. 8C, the WLAN system throughput is increased up to 100% while SPS blanking is reduced over prior art (e.g., as shown in FIG. 9D). In this case, since the device can operate on WLAN2 without causing any interference on the SPS receiver, the SPS receiver can operate concurrently with WLAN2 operation. However, SPS receiver is blanked during operation of WLAN1 TX. In this example, SPS blanking is reduced over the prior art, up to 100% utilization (0% blanking).

FIG. 9D illustrates an example scheduling scenario for coexistence of an SPS receiver with WLAN1 transceiver. As illustrated, the WLAN transceiver time shares its duty cycle with the SPS receiver, which leads to compromised performance.

FIG. 10 illustrates an embodiment of a method that can be used by a device for managing the coexistence of an SPS receiver with one or more RAT transceivers, according to one embodiment of the present disclosure. At 1002, the device determines whether a first transceiver of the one or more transceivers in accordance with a first Radio Access Technology (RAT) is able to transmit a packet via a first frequency band within a time period based at least on a first coexistence rule. As an example, the device determines whether or not the packet can be scheduled to be transmitted on the first frequency band using the first transceiver. The time period may be predefined in the device (e.g., 10 msec, or any other time period). The determination may be made based at least on a first coexistence rule.

In one example, the first coexistence rule corresponds to an impact on the SPS receiver by operation of at least the first RAT on the at least the first transceiver. For example, the impact may be an interference (e.g., direct interference or indirect interference through harmonics and/or intermodulation products) on the SPS receiver caused by operation of at least the first transceiver. In one embodiment, concurrent operation of a transceiver using WLAN and another transceiver using WWAN may cause interference (e.g., IM products) on the operating band of the SPS receiver.

The term coexistence rule is used herein to refer to any rule that is put in place to limit operation of a transceiver to make sure two or more transceivers (operating under similar or different RATs) can coexist in a device. The coexistence rules ensure that each of the transceivers can operate properly for at least some time period. For example, duty-cycle limitation, blanking, and any other rules may be used to ensure coexistence of different transceivers and/or RATs. In one example, coexistence rules may be defined to limit interference on a transceiver caused by operation of one or more other transceivers.

In one embodiment, the first RAT may be defined as a primary RAT for transmissions by the first transceiver. For example, the first transceiver may primarily transmit using WLAN1. In one example, the first transceiver transmits one or more packets on WLAN1 and transmits another one or more packets on WLAN2 when WLAN 1 is not available. In general, a RAT may not be available for transmission if there exist some rules (e.g., coexistence rules) that limits operation of the RAT. For example, one or more coexistence rules may be applied to the RAT to ensure proper operation of other RATs.

In general, the coexistence rule may be put in place for many different reasons without departing from the teachings of the present disclosure. In one example, the coexistence rule may put in place because of an impact or a possible impact (e.g., interference) on the operation of the SPS receiver. In another example, the coexistence rule may be defined based on other criteria (operator preferences, network parameters, etc.)

At 1004, the device transmits the packet via a second frequency band in accordance with a second RAT based on the determination that the first transceiver in accordance with the first RAT is not able to transmit the packet via a first frequency band within the time period.

In one embodiment, the first RAT and the second RAT may correspond to a common type of wireless network. In one embodiment, the first frequency band may be different from the second frequency band. For example, both the first RAT and the second RAT may correspond to WLAN. It should be noted that the first RAT and the second RAT may correspond to different protocols within WLAN, PAN, and/or WWAN category, such as LTE, CDMA, GSM or the like without departing from the teachings of the present disclosure.

Figure 12:
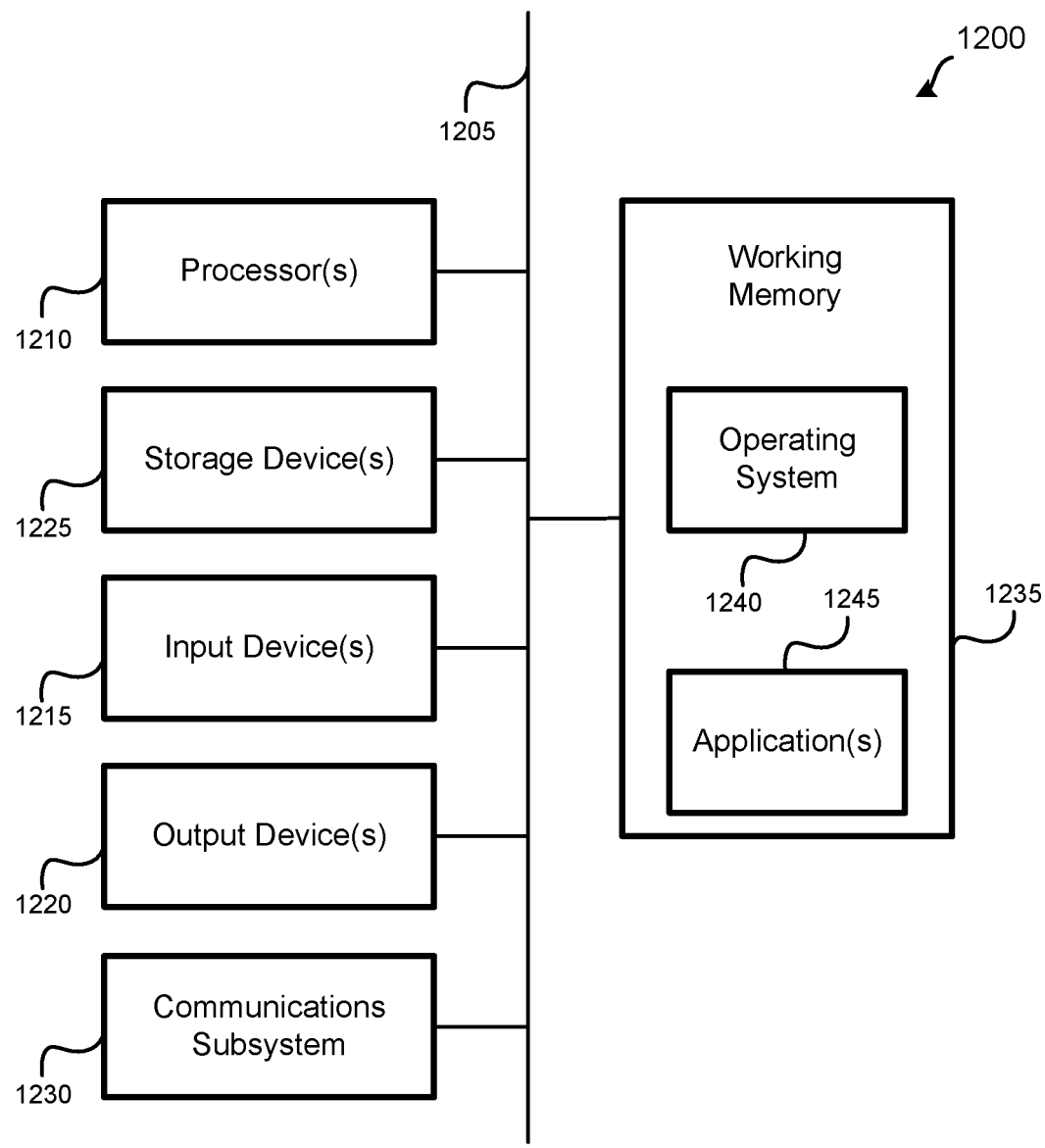
FIG. 12 illustrates an embodiment of a computer system, such as a mobile device, according to one embodiment of the present disclosure.

In one embodiment, a device for managing coexistence of a SPS receiver with one or more transceivers may include means for obtaining a packet to be transmitted. Means for obtaining a packet may be a communications subsystem 1230 for obtaining a packet from other devices (as illustrated in FIG. 12). In another embodiment, means for obtaining may be or one or more processor(s) 1210 that obtain the packet from memory or other internal components of the device.

In addition, the apparatus may include means for determining whether the packet can be transmitted on a first frequency band. For example, one or more processors 1210 and/or one or more transceivers may be used to determine whether the packet may be transmitted on a frequency band. The apparatus may also include means for transmitting the packet via a second frequency band. Means for transmitting may include the communications subsystem 1230 as illustrated in FIG. 12. In general, the communications subsystem may include one or more transceivers. Each of the transceivers may be capable of operating in accordance with one or more RATs.

It should be noted that although most of the examples are described herein refer to WLAN and/or WWAN as example RATs, in general, the methods described herein may be applied to any radio technologies (e.g., cellular and/or non-cellular), without departing from the teachings of the present disclosure.

The methods disclosed herein can be used in intra-WLAN RAT, intra-WWAN RAT, and WLAN-WWAN session transfers, for the purpose of SPS impacts. Most devices support dual band WLAN operation at 2.4 and 5 GHz using the IEEE 802.11a/b/g/n/ac standards. Future WLAN standards such as 802.11ad/ah will operate in the 60 GHz and 900 MHz bands respectively. Other WLAN standards are being proposed to operate in the 3.5 GHz, and TV white space spectrum from 54-790 MHz. Dynamic channel/band selection efforts (although not considering SPS) are in development and will likely be supported in the WLAN standards.

The proposed methods can be used in Fast Session Transfer without departing from the teachings of the present disclosure. Fast Session Transfer (FST) refers to a method to seamlessly hand off sessions between various WLAN frequencies without interrupting the data. For example, a device may handoff between 2.4 GHz, 5 GHz, and/or 60 GHz, or any other frequencies. Further, any other band steering technique other than FST can also be utilized. As an example, 802.11v can be used to band steer between 2.4 and 5 GHz; 802.11ai fast initial link setup (FILS) can be used for fast WiFi roaming; 802.11r basic service set (BSS) transition management may also be used for fast roaming on the same or different service set identifiers (SSIDs). Any other method may also be used without departing from the teachings of the present disclosure.

Figure 11:
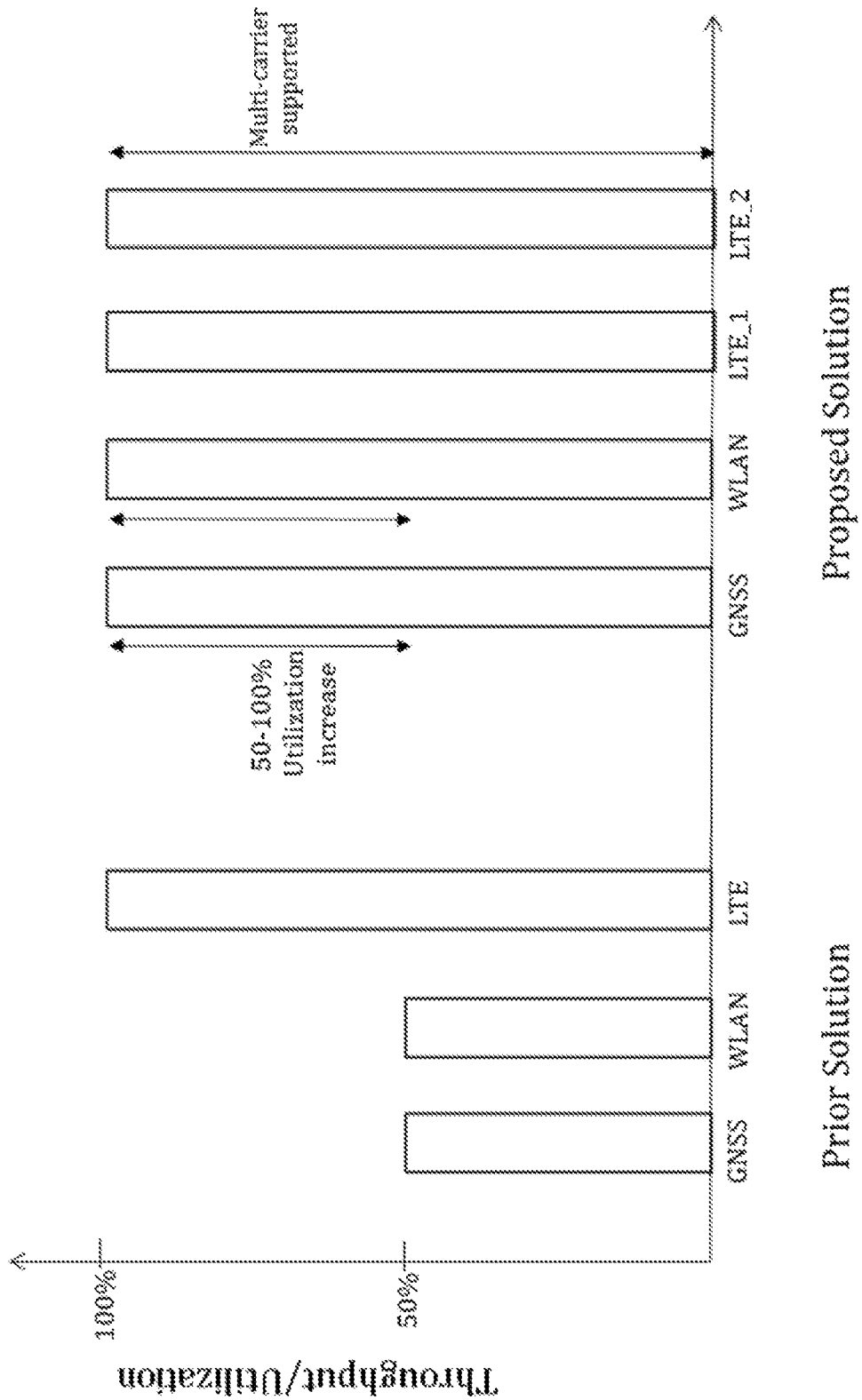
FIG. 11 illustrates an example graph showing throughput enhancement of proposed techniques, according to one embodiment of the present disclosure.

FIG. 11 illustrates an example graph showing throughput enhancement of proposed techniques, according to one embodiment of the present disclosure. As illustrated, utilization of the SPS (e.g., GNSS) receiver and the system throughput of the WLAN transceivers can increase from 50 percent up to 100% by utilizing the proposed methods. In addition, increased throughput of LTE/WWAN in multicarrier cases is afforded (along with SPS and WLAN concurrency).

In one embodiment, the device may have more than one (e.g., multi-constellation) SPS receivers. In one example, one or more of the SPS receivers may be subject to interference from other RATs. Depending on the circumstances, different SPS receivers may be impacted the same or differently by the other RATs. For example, a first SPS receiver may experience coexistence interference from other RATs while a second SPS receiver may not be impacted or experience smaller interference. For instance, the second SPS receiver may be directed to search a set of SPS constellations which are not impacted by the interference (e.g., operate at downlink frequencies that are not impacted). Other parameters such as direction of antennas corresponding to each SPS receiver, operating times, and the like can change impact of coexistence interference on each SPS receiver. The techniques described herein may be used to reduce interference on one or more of the SPS receivers.

FIG. 12 provides a schematic illustration of one embodiment of a computer system 1200 that can perform various blocks of the methods provided by various embodiments. A computer system as illustrated in FIG. 12 may be incorporated as part of the previously described computerized devices, such as device 200. For instance, functions of a coexistence manager may be performed by a general-purpose processor implemented as part of computer system 1200. Further, devices 200 and 1000 may reside on a computerized mobile device, such as a tablet computer or cellular phone that contains computer system 1200. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, video decoders, and/or the like); one or more input devices 1215, which can include without limitation a mouse, a keyboard, remote control, and/or the like; and one or more output devices 1220, which can include without limitation a display device, a printer, and/or the like.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication device, GSM, CDMA, WCDMA, LTE, LTE-A, LTE-U, etc.), and/or the like. The communications subsystem 1230 may permit data to be exchanged with a network (such as the network described below, to name one example), other computer systems, and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1200) to perform methods in accordance with various embodiments of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the non-transitory storage device(s) 1225. Merely by way of example, execution of the sequences of instructions contained in the working memory 1235 might cause the processor(s) 1210 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 (and/or components thereof) generally will receive signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

It should further be understood that the components of computer system 1200 can be distributed across a network. For example, some processing may be performed in one location using a first processor while other processing may be performed by another processor remote from the first processor. Other components of computer system 1200 may be similarly distributed. As such, computer system 1200 may be interpreted as a distributed computing system that performs processing in multiple locations. In some instances, computer system 1200 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for managing coexistence of a satellite positioning system ("SPS") receiver with one or more transceivers, comprising:
    transmitting a first packet using a first transceiver of the one or more transceivers at a first frequency band during a first time period in accordance with a first Radio Access Technology ("RAT"); and
    transmitting, subsequent to transmission of the first packet, a second packet at a second frequency band in accordance with a second RAT during the first time period in response to determining transmission of the second packet at the first frequency band during the first time period in accordance with the first RAT would violate one or more coexistence rules, wherein at least one coexistence rule from the one or more coexistences rules corresponds to an impact on the SPS receiver by operation of at least the first RAT on the first transceiver, wherein the first RAT and the second RAT correspond to a common type of RAT, wherein the first frequency band is different from the second frequency band.

2. The method of claim 1, wherein the second RAT is associated with a second coexistence rule corresponding to an impact on the SPS receiver by operation of at least a second transceiver in accordance with the second RAT.

3. The method of claim 1, wherein the common type of wireless network comprises one of a wireless local area network or a wireless wide area network.

4. The method of claim 1, wherein the transmitting the second packet at the second frequency band in accordance with a second RAT uses the first transceiver.

5. The method of claim 1, wherein the transmitting the second packet at the second frequency band in accordance with a second RAT uses a second transceiver different from the first transceiver.

6. The method of claim 1, further comprising selecting the second RAT from among one or more RATs for transmission of the packet.

7. An apparatus for managing coexistence, comprising:
a satellite positioning system ("SPS") receiver;
one or more transceivers;
a memory;
at least one processor coupled to the SPS receiver, the one or more transceivers and the memory, wherein the at least one processor is configured to:
transmit a first packet using a first transceiver of the one or more transceivers at a first frequency band during a first time period in accordance with a first Radio Access Technology ("RAT"); and
transmit, subsequent to transmission of the first packet, a second packet at a second frequency band in accordance with a second RAT during the first time period in response to determining transmission of the second packet at the first frequency band during the first time period in accordance with the first RAT would violate one or more coexistence rules, wherein at least one coexistence rule from the one or more coexistences rules corresponds to an impact on the SPS receiver by operation of at least the first RAT on the first transceiver, wherein the first RAT and the second RAT correspond to a common type of RAT, wherein the first frequency band is different from the second frequency band.

8. The apparatus of claim 7, wherein the second RAT is associated with a second coexistence rule corresponding to an impact on the SPS receiver by operation of at least a second transceiver in accordance with the second RAT.

9. The apparatus of claim 7, wherein the common type of wireless network comprises one of a wireless local area network or a wireless wide area network.

10. The apparatus of claim 7, wherein the processor is configured to transmit the second packet at the second frequency band in accordance with a second RAT using the first transceiver.

11. The apparatus of claim 7, wherein the processor is configured to transmit the second packet at the second frequency band in accordance with a second RAT uses a second transceiver of the one or more transceivers different from the first transceiver.

12. The apparatus of claim 7, wherein the processor is further configured to select the second RAT from among one or more RATs for transmission of the packet.

13. An apparatus for managing coexistence of a satellite positioning system ("SPS") receiver with one or more transceivers, comprising:
means for transmitting a first packet using a first transceiver at a first frequency band during a first time period in accordance with a first Radio Access Technology ("RAT"); and
means for transmitting, subsequent to transmission of the first packet, a second packet at a second frequency band in accordance with a second RAT during the first time period in response to determining transmission of the second packet at the first frequency band during the first time period in accordance with the first RAT would violate one or more coexistence rules, wherein at least one coexistence rule from the one or more coexistences rules corresponds to an impact on the SPS receiver by operation of at least the first RAT on the first transceiver, wherein the first RAT and the second RAT correspond to a common type of RAT, wherein the first frequency band is different from the second frequency band.

14. The apparatus of claim 13, wherein the second RAT is associated with a second coexistence rule corresponding to an impact on the SPS receiver by operation of at least a second transceiver in accordance with the second RAT.

15. The apparatus of claim 13, wherein the common type of wireless network comprises one of a wireless local area network or a wireless wide area network.

16. The apparatus of claim 13, wherein the means for transmitting the second packet at the second frequency band in accordance with a second RAT uses the first transceiver.

17. The apparatus of claim 13, wherein the means for transmitting the second packet at the second frequency band in accordance with a second RAT uses a second transceiver different from the first transceiver.

18. The apparatus of claim 13, further comprising means for selecting the second RAT from among one or more RATs for transmission of the packet.

19. A non-transitory computer-readable medium comprising processor-executable instructions configured to cause a processor to:
transmit a first packet using a first transceiver at a first frequency band during a first time period in accordance with a first Radio Access Technology ("RAT"); and
transmit, subsequent to transmission of the first packet, a second packet at a second frequency band in accordance with a second RAT during the first time period in response to determining transmission of the second packet at the first frequency band during the first time period in accordance with the first RAT would violate one or more coexistence rules, wherein at least one coexistence rule from the one or more coexistences rules corresponds to an impact on a satellite positioning system ("SPS") receiver by operation of at least the first RAT on the first transceiver, wherein the first RAT and the second RAT correspond to a common type of RAT, wherein the first frequency band is different from the second frequency band.

20. The non-transitory computer-readable medium of claim 19, wherein the second RAT is associated with a second coexistence rule corresponding to an impact on the SPS receiver by operation of at least a second transceiver in accordance with the second RAT.

21. The non-transitory computer-readable medium of claim 19, wherein the common type of wireless network comprises one of a wireless local area network or a wireless wide area network.

22. The non-transitory computer-readable medium of claim 19, wherein the processor-executable instructions are configured to cause the processor to transmit the second packet at the second frequency band in accordance with a second RAT using the first transceiver.

23. The non-transitory computer-readable medium of claim 19, wherein the processor-executable instructions are configured to cause the processor to transmit the second packet at the second frequency band in accordance with a second RAT using a second transceiver different from the first transceiver.

24. The non-transitory computer-readable medium of claim 19, wherein the processor is further configured to select the second RAT from among one or more RATs for transmission of the packet.

* * * * *